Jan. 30, 1962

L. E. ORR 3,019,135

METHOD OF PRODUCING COATED GLASS ARTICLES

Original Filed May 19, 1955

INVENTOR
LEIGHTON E. ORR

BY Oscar L Spencer
ATTORNEY

United States Patent Office 3,019,135
Patented Jan. 30, 1962

3,019,135
METHOD OF PRODUCING COATED
GLASS ARTICLES
Leighton E. Orr, Tarentum, Pa., assignor to Pittsburgh Plate Glass Company, a corporation of Pennsylvania
Original application May 19, 1955, Ser. No. 509,552. Divided and this application Oct. 17, 1957, Ser. No. 690,600
17 Claims. (Cl. 117—211)

The present application is a division of application Serial No. 509,552, filed May 19, 1955, for Method of Producing Coated Glass Articles, which in turn, is co-pending with application Serial No. 220,429 of Leighton E. Orr, filed April 11, 1951 for Method of Producing an Electroconductive Article, now abandoned, which in turn, is a continuation-in-part of application Serial No. 61,191, filed November 20, 1948, now U.S. Patent No. 2,569,773.

This invention relates to an improved method for depositing non-uniform coatings upon ceramic or refractory viewing closures. In one aspect, the present invention relates to depositing electroconductive transparent coatings upon ceramic or refractory viewing closures, particularly those provided with laterally spaced electroconductive strips or bus bars in electrical contact with the film and adapted to facilitate passage of electric current through the coating.

According to the present invention, conventional methods hitherto used to produce metal oxide films, wherein a relatively cool spray of film forming composition capable of forming a metal oxide film upon contacting a refractory base whose temperature is above 400° F., but incapable of forming a metal oxide film upon contacting the refractory base when the base is at a temperature substantially below 400° F. is applied to a previously heated refractory base, are modified according to the teaching of the present invention to produce metal oxide films of varying thickness. Specifically, a sheet of refractory material is heated in a furnace above film forming temperature and below the temperature at which the base becomes molten, removed from the furnace in proper orientation relative to the spray, and immediately exposed to a spray of a film forming composition having at least one dense and one sparse region. Relative motion is established between the base and the spray at such a velocity that a continuous film having a transverse thickness pattern conforming to the spray density pattern forms on the base. However, since the realization that each increment of the base along the axis of relative movement is cooled upon contact with the spray, it has been found necessary, according to the present invention, to remove each increment from contact with the spray before the temperature of any portion of the increment falls below the minimum film forming temperature. Failure to effect this removal in time results in a tendency of the film to depart from its variation transversely of the axis of movement and become more uniform in thickness.

It is known that transparent electroconductive films may be deposited upon glass by applying stannic chloride to the surface of glass heated above 400° F., preferably 850° to 1350° F. Films of superior conductivity may be produced by spraying plate, window or other glass while it is heated to a temperature of above 400° F. but below the temperature at which the glass becomes molten, with tin tetrachloride or other tin salts in aqueous solution or in vapor state, in the presence of a reducing agent such as methanol, phenyl hydrazine hydrochloride, or other agents. The films thus obtained are of unknown composition, but appear to contain a preponderant amount, on the order of 97% to 99%, of a tin oxide and certain impurities which may include metallic tin, carbon, silicon, sodium and chlorine and other impurities, depending upon the composition of the applied tin containing solution. These films have a thickness of about 50 to 800 millimicrons, are transparent and have the unusual characteristic of being electroconductive. The particular degree of electroconductivity is dependent, to a large degree, upon the nature of the process of depositing the films and the composition of the tin bearing solution. These tin oxide films have a surface resistivity below about 500 ohms per unit square, and a specific resistivity below about 0.01 ohm centimeters. Further details respecting the production of these films will be supplied hereinafter.

Although articles having such films are useful in many fields, they have been found to be especially useful as windshields or viewing closures in automobiles, aircraft, trains and similar motive vehicles. In such use, the coating is placed in series with a source of electric potential and is used as a heating element in order to heat the closure and prevent deposition of ice, fog, etc. thereupon.

In the production of such electroconductive articles, a glass sheet, usually of plate glass or other flat glass structure (including bent or curved glass structures), is provided with conducting metal strips suitable for bus bars. These strips are generally located adjacent the edges of the glass (usually within 0.5 inch of the edge) and, in the preferred embodiments, are located on opposed marginal edges. For example, in an essentially rectangular viewing closure such as a windshield, two bus bars are applied on a pair of opposite marginal edges. These metallized strips must be capable of withstanding the temperatures and oxidizing conditions of treatment and, therefore, preferably should be of a ceramic character. Furthermore, they should be capable of glazing or otherwise forming an adherent, well-bonded coating to the glass. The strips should adhere firmly to the glass sheet, and should have a conductivity at least 10 to 20 times that of the conductive coating. Generally, the strips are from about 0.1 to 1 inch in width. Also, strips of an air drying non-fired silver may be placed atop the electroconductive coating for the bus bars.

In practice, it has been found that the most satisfactory compositions, for use in preparing the bus bars, comprise a highly conductive metal powder (preferably gold or silver), and a vitrifying binder. The ingredients forming the vitrifying binder, for example, litharge, boric acid and silica, are heated to a sufficient temperature, for example 1700° F., to compel them to fuse and form a glass-like mass. This mass is then converted into a frit by grinding, usually in a ball mill. The electroconductive metal, such as finely divided silver, is then added to this frit and spraying or screening vehicles are added to the compositions to facilitate their application. Some of the vehicles usually employed are French fat oil, turpentine, water and ethyl alcohol. In order to avoid production of bus bars which will develop, in use, excessive stresses in the glass, the bus bars preferably should be located on the extreme edge of the glass and the bus bar thickness should not exceed about 0.005 inch and, preferably, should be below about 0.003 inch.

After application of the metal bus bars to the glass sheet by painting or other method, the sheet is heated to the temperature at which application of the conductive coating may be effected, for example, above about 400 to 800° F. but below the fusion point of the glass. Usually, 950 to 1150° F. is the temperature range selected. During this heating operation, the ceramic metal coating becomes glazed and is fused onto the glass so that a firm bond is established between the glass and the metal coating.

When the glass has been heated as described above, it is withdrawn from the heating chamber and immediately sprayed with the coating solution before substantial cooling of the glass sheet can take place. A quantity of the coating solution is placed in an atomizing spray gun and the heated glass sheet is sprayed with an atomized spray of this material. Usually this spraying operation is conducted in air of atmospheric humidity or oxygen. However, conductive coatings have been obtained even when oxygen appears to be absent, although it is probable that oxygen, either from the atmosphere or combined in water or similar compound, is present. This process results in the production of a base coated with a tin oxide electroconductive film.

Articles produced according to the above description, further details of which will be supplied below, are suitable for use as viewing closures or windows. Usually they are laminated with a suitable plastic such as polyvinyl butyral to reinforce the glass and provide a so-called "safety glass" construction. These closures may be heated successfully by imposing an electric potential across the bus bars, thus using the conductive film as a resistance element.

Products so made have been satisfactory where the energy requirements for heating the glass sheet have not been large. In many cases, however, these products must be capable of supplying quite large amounts of heat, for example above 1500 to 2000 B.t.u. per hour per square foot. Such requirements mean that electric currents of substantial amperage pass through the film.

It has been found that an unduly large number of windshields or like panels of the type herein contemplated have failed in use or in test because of glass fracture during passage of current through the electroconductive film. The present invention may be utilized to manufacture articles less subject to failure. This is accomplished by applying electroconductive films having non-uniform resistance per unit area. The distribution of the surface resistivity of the film so applied in such that areas in the film which tend to develop the highest temperature and/or to generate the most heat are located at points spaced from the bus bars a substantial distance, for example at least 5 to 10% of this distance between the bus bars. This is usually at least 1 to 2 inches for commercial windshields. This may be accomplished by providing electroconductive films which have their maximum conductivity immediately adjacent the bus bar and lower conductivity in the area spaced from the bus bars in the current path between bus bars.

Ideally speaking, it is desirable that each area or areas of maximum heat generation or temperature development be spaced from the bus bars as herein contemplated. However this may not be entirely possible because of the configuration of the sheet or base.

For example, many articles having electroconductive films are not rectangular. Consequently, bus bars near opposite edges thereof may be of unequal length and may be disposed in a non-parallel manner. Frequently, in such cases, high current densities tend to be established at the ends of the bus bars particularly when the bus bars are tapered to a point at their ends. Similarly, the distance between opposed parts of the bus bars may vary so greatly as to establish high current densities at certain areas along a bus bar. At these areas, heat generation tends to be high and may even exceed the heat generation of other areas on the sheet or base. This is undesirable and should be avoided.

Even in cases where it is impossible or exceedingly difficult to avoid some hot spots at or near the bus bar, the amount of heat generation and/or temperature increase may be reduced by providing a film area in the current path to such hot spots having higher resistance per unit square than that of the film adjacent the bus bar.

The provision of films wherein the preponderant areas of maximum resistance per unit area are spaced a substantial distance from the bus bars offers certain advantages in addition to minimizing breakage and breakdown of the film adjacent the bus bars. When articles herein contemplated are used as viewing closures in aircraft or other vehicles, the central area of the film remains free of ice, snow or mist under atmospheric conditions so severe that it is not possible with the power available to prevent their accumulation over the entire panel surface.

It has been found that when stannic chloride or like film forming compound is sprayed upon a hot glass surface even for a relatively short period of time during which the surface is cooled to below film forming temperature, the resulting transparent film is essentially uniform in thickness even though the density of the spray is not uniform. According to this invention, however, it has been discovered when a spray of non-uniform density is used, a film of non-uniform thickness may be obtained if the spraying operation is interrupted early enough and before essentially uniform film thickness has been achieved.

Thus, in accordance with this invention, a novel method of providing a refractory base with an electroconductive film of prescribed non-uniform resistance per unit square in a single spraying operation has been discovered. According to this method, a heated refractory base is sprayed with a suitable film forming solution while maintaining a spray pattern of non-uniform density, i.e., a spray pattern which is more concentrated at certain portions thereof than at other portions thereof, and the spraying is discontinued after an essentially continuous film has been formed but before the temperature of any portion of the base falls below minimum film forming temperature.

The spraying operation must be conducted within certain critical limits in order that a film of non-uniform resistance per unit square can be obtained. If the spraying operation is continued too long, the amount of film formed on all portions of the heated base tends to be uniform and a film of substantially uniform thickness and uniform resistance per unit square is formed. Therefore, the complete spraying operation must be conducted within a matter of only a few seconds.

The amount of film which can be formed on the base is a function of the amount of spraying solution brought into contact with the base while the base is at film formation temperature. Thus in order to achieve a transparent electroconductive film of non-uniform thickness and non-uniform resistance per unit area by use of a spray pattern of non-uniform density, the spraying must be performed within certain limits insofar as the amount of film forming solution which is brought into contact with the heated base is concerned. This amount varies from an amount sufficient to form an essentially continuous film, to an amount which is less than an amount necessary to form a maximum amount of film on all portions of the heated base. It is to be understood that if the spraying operation is continued up to or beyond this point of maximum film formation, a film of substantially uniform resistance per unit area is formed. This undesirable result is accomplished because while the areas of the base exposed to the dense regions of the spray are cooled below film forming temperature, other areas of the base exposed to the sparse regions of the spray are still above the minimum film forming temperature. Therefore, the film continues to form in the other areas, unless the spraying is discontinued or the exposure of the base to the spray otherwise stopped before any area is cooled to below minimum film forming temperature by virtue of contact with the spray.

It is known that the amount of film formation and the resistivity of the film are also affected by the ingredients of the spraying solution, the humidity of the spraying atmosphere and the temperature of the base when sprayed, but such effects are not of great importance in achieving a film of non-uniform resistance per unit area by a single spraying operation for they exert the same effect on all portions of the film, thereby tending to effect different areas of the sprayed base an equal amount.

The transparent, electroconductive films formed by such spraying techniques are not limited to those consisting essentially of tin oxide, as described above. Films of indium oxide, cadmium oxide, zinc oxide and other metallic oxides and mixtures of these oxides with each other and with minor amounts of other oxides having the properties of transparency and electroconductivity may be produced by spraying solutions of the proper metal salts or mixtures thereof on heated glass plates. The principles enunciated above may be utilized to provide films containing these other oxides and having the desired non-uniform conductivity.

Figure 1:
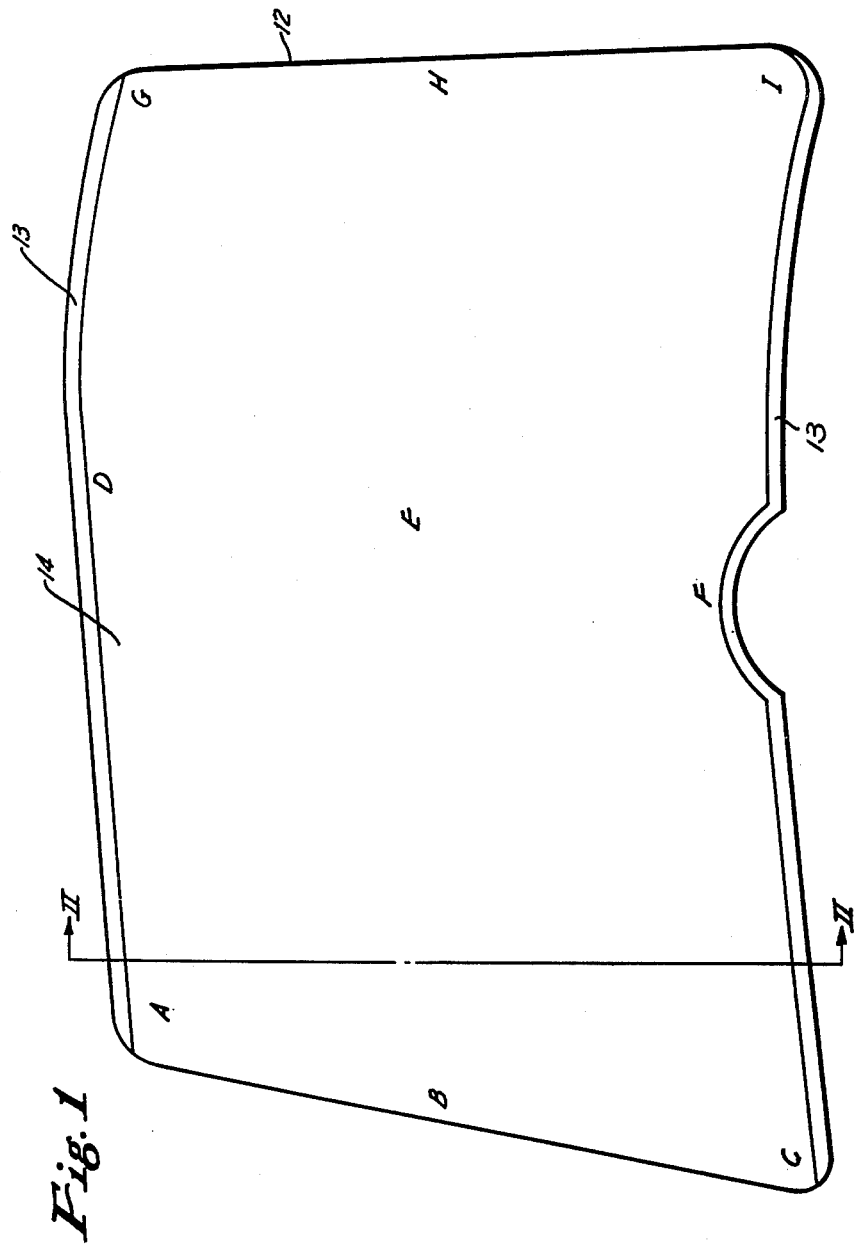
FIGURE 1 is a plan view drawn to scale of a glass panel having a transparent, electroconductive coating of varying conductivity suitable for use as a viewing closure in military aircraft.

The panel illustrated in FIGURE 1 comprises a glass sheet 12 of substantially rectangular shape and rounded corners having bus bars or conductive edge strips 13 of an electroconductive metal such as silver, gold, etc. along opposite sides and close to the edges (preferably within 0.2 inch of the edge of the glass sheet). These bus bars, which are approximately one-eighth to one inch in width, are disposed along the margins adjacent to the longest pair of opposite edges of the panel, whereby the distance between the bus bars is held to a minimum. Alternatively, they may be disposed on the opposite pair of shorter edges of the panel. The entire surface area between the bus bars is provided with an electroconductive transparent film 14 of tin oxide or other material, such as is described hereinbefore.

As illustrated in FIGURE 1, the width of the glass sheet 12 is not constant but varies from a minimum at the center to a maximum near the ends thereof. Furthermore, the corners of the sheet are curved or rounded. Such rounded corners are desirable for certain structural reasons. However, when bus bars are disposed upon such sheets, the film adjacent the ends thereof gets too hot for plastic, sometimes cracking the glass or "burns out," particularly when the sheet is coated over its entire area with the electroconductive coating having a uniform surface resistivity.

It has been found that this difficulty may be avoided to an appreciable degree by use of bus bars which are tapered to a point at their rounded ends. This taper generally begins after the change of curvature of the sheet begins and extends for a distance of about one-eighth to one or two inches terminating before the end of the curve. Frequently the tapered portion extends around the corner of the sheet although this is not absolutely essential. When bars so constructed are employed, the film adjacent the bus bars exhibits less tendency to burn during use of the conductive panel.

Figure 2:
FIGURE 2 is a diagrammatic sectional view taken along lines II—II of FIGURE 1.

As shown with the film greatly enlarged in FIGURE 2, the electroconductive film 14 is thickest at the edges adjacent the bus bars and is thinnest in the central area. Because of this variation in thickness, the conductivity of the areas adjacent the bus bars is greater than that of central areas.

Figure 3:
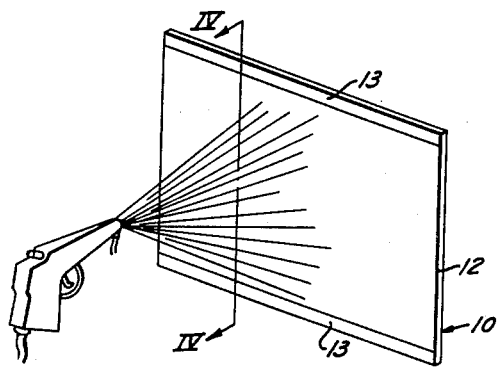
FIGURE 3 is a diagrammatic perspective view of a method of preparing a glass panel according to this invention.
Figure 4:
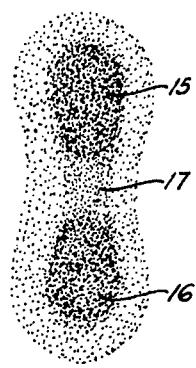
FIGURE 4 is a sectional view of FIGURE 3 taken along lines IV—IV of FIGURE 3 which run in a direction perpendicular to the path of the spray.

This coating may be deposited according to the method illustrated in FIGURES 3 and 4. According to this method a glass sheet is provided with suitable bus bars 13 by applying a thin coating of a conducting metallizing ceramic composition such as described above.

After application of the metal bus bars to the glass sheet by painting or other method, the sheet is heated to the temperature at which application of the conductive coating may be effected, for example above about 600 to 800° F. but below the fusion point of the glass, usually 950 to 1250° F. During this heating operation, the ceramic metal coating becomes glazed and is fired onto the glass so that a firm bond is established between the glass and the metal coating. It is to be understood that certain types of metal bus bars may be applied after the electroconductive film is applied. In such cases, the glass sheet is heated and sprayed before the application of the bus bars.

When the glass has been heated for one, two or more minutes, it is withdrawn from the heating chamber and immediately is sprayed with the coating solution before substantial cooling of the glass sheet can take place. In this operation, a quantity of the coating solution is placed in an atomizing spray gun and the heated glass sheet is sprayed with an atomized spray of this material for a brief period.

In order to obtain the film having the desired thickness variation, the spray gun is mounted and adjusted to produce a horizontally directed "split" or "dumbbell" type spray which has the spray pattern illustrated by the dots of the sectional view in FIGURE 4, being wider and more dense adjacent the spaced upper and lower end regions 15, 16 of the spray section than in the center region 17 thereof. This spray pattern may be obtained in a conventional manner with conventional spray guns simply by using atomizing air pressures above that required to produce a uniform spray, or by adjusting the spray gun nozzle to widen the spray at pressures where a uniform spray is obtained.

When the spray gun has been adjusted to produce the spray pattern illustrated in FIGURE 4, the glass is supported vertically and is moved transversely through the spray with the upper and lower edges of the sheet (having bus bars 13 disposed thereon) passing horizontally through the upper and lower dense areas of the spray, respectively. The sheet is passed through the spray at a rate such that a sheet approximately 26 inches long in its longest dimension and having the contour illustrated in FIGURE 1 is sprayed within a matter of two to twenty seconds. Thereafter, the sheet is cooled. If necessary, in order to thicken the coating, the glass may be reheated and resprayed.

It is to be understood of course that other procedures may be employed in spraying the base. For instance, the base may be maintained stationary and the spray passed horizontally over the base with the upper and lower dense areas passing over the upper and lower edges of the base respectively. Also where a relatively small base is being sprayed or where a large spray is being employed, the base and spray may both be maintained stationary. In any event, the exposure of any transverse section of the base to the spray must end before any portion within the transverse section is cooled below the minimum film forming temperature.

Various solutions may be used for this purpose. Typical suitable solutions or mixtures are the following:

1. 90 percent by weight $SnCl_4 \cdot 5H_2O$
    10 percent by weight aqueous formaldehyde (containing 40 percent by weight of formaldehyde).
2. 900 grams $SnCl_4 \cdot 5H_2O$.
    21 grams phenyl hydrazine hydrochloride.
    90 milliliters methanol.

3. Anhydrous stannic chloride -------- 20,430 grams.
   Methanol --------------------- 1,854 milliliters.
   Phenyl hydrazine -------------- 21 grams.
   Water ------------------------ 7,056 milliliters.
   Dioctyl sodium sulfosuccinate solution -------- 918 grams.
   Such solution composed of:
     Dioctyl sodium sulfosuccinate -------- 10 grams.
     Methanol ------------------- 45 milliliters.
     Water ---------------------- 45 milliliters.
4. Solution No. 3 (without dioctyl sodium sulfosuccinate) -------- 70 milliliters.
   Aqueous formaldehyde containing 40% by weight of formaldehyde -------- 45 grams.
   Ammonium bifluoride ---------- 3 grams.
5. Solution No. 2 ---------------- 100 grams.
   Antimony trichloride --------- 1 or 2 grams per gram of stannic chloride in solution No. 3.
6. Stannous fluoride ------------- 5 grams.
   Methanol --------------------- 4 grams.
   Water ------------------------ 25 grams.
7. Methanol --------------------- 1,000 milliliters.
   Anhydrous stannic chloride --- 170 milliliters.
   Ammonium bifluoride ---------- 6 grams.

Furthermore, anhydrous stannic chloride in liquid or vapor form may be sprayed in this manner. In addition, other tin salts such as stannous chloride, stannic iodide, stannic fluoride as well as salts of other metals which are capable of producing transparent electroconductive coatings (cadmium chloride or bromide, zinc acetate or bromide, indium triiodide, titanium tetrachloride, etc.) may be used.

The article thus obtained comprises a glass base or sheet with an electroconductive film of the type described thereupon. The thickness of this film is diagrammatically illustrated in FIG. 2 and thus appreciable variation in conductivity of the film may be detected.

Using a typical sheet produced according to the above process, the resistance of unit inch squares at various areas designated as A, B, C, D, E, F, G, H and I (FIGURE 1) was measured. Areas A, D, G, C, F and I were located within about one or two inches of the side edges, areas A, G, C and I being only about two inches from the ends of the sheet and areas D and F being about in the middle of the sheet. Areas B, E and H were located approximately midway between areas A and C, D and F, and G and I respectively. The resistance per unit square in terms of ohms per unit square (the surface resistance of an area one inch square) were as follows:

| | Ohms per unit square |
|---|---|
| Area A | 92 |
| Area B | 136 |
| Area C | 97 |
| Area D | 92 |
| Area E | 102 |
| Area F | 77 |
| Area G | 138 |
| Area H | 175 |
| Area I | 140 |

It will be understood that the resistance set forth above is the average resistance of a one inch square. Thus even though the resistance may have been high or even infinite at a single point of minute area within the square, the resistance of the square was as stated above. From the above table it will be apparent that the area of maximum resistance of the film is at the zone spaced from the bus bars and designated as H.

It will further be apparent that in general an area intermediate the shortest path between the bus bars at substantially any point along the bars is higher in resistance than the areas in the same path which are adjacent the bus bar. It is not necessary that the resistance in the central area be higher than the resistance along the entire length of the bus bars. It is only desired that, in determining the resistance, any shortest linear path from a point on one bus bar to the other bus bar (for example from A through B to C or from D through E to F) will pass through a central area spaced from at least one of the bus bars a distance of at least 5 percent of the length of the path which is higher as to resistance per unit square than the area within 5 percent of the length of the path (for example one inch) of the bus bar. Usually, the average resistance per unit square of the film within such distance from a bus bar is below the average resistance of the film.

It will be understood that wide variation in resistance over the film is permissible. Such variation is permissible so long as the current distribution during passage of current is such that the zones or areas of highest temperature (or current density) are spaced at least one or more inches from the bus bar and that the temperature of the film adjacent the bus bar is lower than that of the area of maximum temperature or heat generation in the film.

The variation in resistance between the central area and the areas adjacent the bus bars need not be large. Thus, as shown in the above table, the resistance of area D is but 5 percent less than the resistance of central area E. The difference should at all events be at least sufficient to prevent the establishment of maximum heat generation or current density in the conducting area of the film adjacent the bus bar. This usually requires that the resistance per unit square (surface resistivity) of areas adjacent the bus bars be at least 3 to 5 percent below the area of maximum surface resistivity in the entire film (as measured in terms of unit inch squares) and preferably that the surface resistivity of film areas at most of the points along the bus bar be at least 5 to 10 percent below that of the central area which is in the shortest path to the opposite bus bar. For example areas A, D and G should be at least 3 to 5 percent lower in resistance than the areas B, E and H respectively. In general, the average surface resistivity of a strip along the bus bar and 5 percent of the distance between the bus bars in width will be lower than that of the entire sheet or at least that of an equal sized strip between the bus bars and spaced therefrom. Preferably the change of surface resistivity is gradual and abrupt changes normally are avoided.

A convenient method of observing and determining the location of the zone of highest heat generation on the panel involves coating the electroconductive film with a thin coating (about 0.001 inch in thickness) of an easily fusible material such as beeswax, applying a suitable electric potential, for example 10–400 volts, between the bus bars and observing the point at which the wax first melts. This point may be considered to be the zone or area of maximum heat generation.

In certain cases it is not necessary that areas of low surface resistivity be adjacent both bus bars. For example, when the configuration of an article is such that one bus bar of two parallel bus bars is substantially longer than the other, the highest current density tends to be established adjacent the shorter bus bar. To prevent excessive heat generation, the area adjacent the shorter bus bar should have lower average surface resistivity than the other area spaced therefrom. On the other hand, the areas along the longer bus bar do not tend to generate excessive heat, and therefore, no special precautions may be required along this bar.

Attention is called to the fact that the resistance of the areas G, H and I are appreciably higher than the resistance in the areas on the left side of the panel, A, B and C, or in the central areas D, E and F. This variation is established upon moving the plate or sheet through the spray, the leading edge usually having the highest resistance. When higher surface resistivities are desired at one end than at the other end, they may be obtained simply by passing the panel through the spray with the end desired to have the higher surface resistivity being the leading edge.

In certain cases it is not necessary that the areas of low surface resistivity be adjacent both bus bars throughout their length. Sometimes it is desired that such areas of low surface resistivity be disposed somewhere intermediate the bus bars. This is the case in panels having a contour such that the bus bars must be disposed in a non-parallel relationship. A typical illustration of this type of panel is set forth in FIGURE 5 showing a panel in the shape of a trapezoid.

Figure 5:
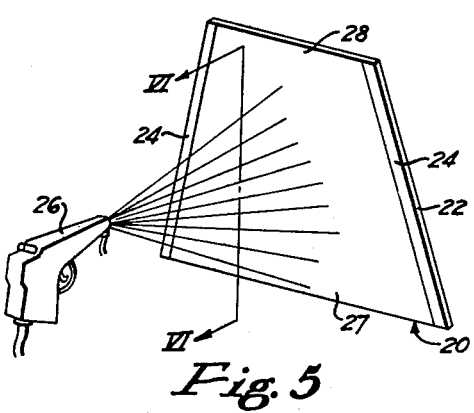
FIGURE 5 is a diagrammatic perspective view of another method of preparing a glass panel according to this invention.

In FIGURE 5 a panel 20 is shown in perspective being sprayed with a metal salt solution suitable for producing a transparent electroconductive coating. The panel 20 comprises a glass base 22 in the form of a trapezoid having bus bars 24 disposed along the non-parallel edges of the base. If a film of uniform surface resistivity were deposited on this glass sheet 20, there would be a tendency for the sections of the panel intermediate the closer or upper termini of the bus bars to heat up more than the rest of the panel because current passes more readily through the electroconductive coating where the distance between opposed sections of the bus bars is shortest. This frequently causes failures of the film adjacent the closer termini of the bus bars.

Figure 6:
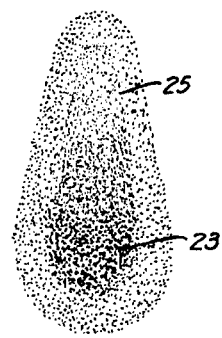
FIGURE 6 is a sectional view of FIGURE 5 taken along lines VI—VI of FIGURE 5 which run in a direction perpendicular to the path of the spray.

However, in accordance with this invention, if a film of non-uniform surface resistivity is applied in such manner that the resistance of the film between the bus bars is substantially the same throughout their length, such failures are avoided. Such a film of non-uniform surface resistivity is produced on the panel 20 of FIGURE 5 by adjusting the spray gun so that an elongated spray pattern is formed such as is shown in FIGURE 6. The spray pattern is wider and more dense at the lower half 23 of the pattern than at the upper half 25. This pattern may be obtained with conventional spray guns simply by adjusting the air pressure of a spray gun 26 having two air ports so that a higher air pressure is employed at one port than at the other.

The dense region 23 of the spray pattern shown in FIGURE 6 is lined up with the areas of the glass base 22 in FIGURE 5 so that the dense region of the spray impinges on the glass in the area where it is desired that the surface resistivity of the film be lowest. In the panel shown in FIGURE 5 such area is that area intermediate the termini of the bus bars which are farthest apart, i.e., the longer edge portion 27 of the panel. In like manner, the sparse region 25 of the spray pattern is lined up with the base so that it impinges on the base in the area where a film of higher surface resistivity is desired. This area would be the shorter edge portion 28 between the closer termini of the bus bars in the panel in FIGURE 5, i.e., the upper portion of the panel.

The following examples illustrate the fact that the spraying operation must be carried out within certain specified conditions in order to produce transparent electroconductive films of non-uniform resistivity.

EXAMPLE I

A series of six rectangular glass sheets 20" x 26" x ⁹⁄₆₄" were individually heated in a furnace at a furnace temperature of 1200° F. for about three minutes, conveyed from the furnace on a preheated horizontal conveyor, immediately sprayed with a stannic chloride solution consisting of the following ingredients:

Stannic chloride_____grams__ 20,430
Phenylhydrazine hydrochloride_____do____   639
An aqueous 48 percent by weight solution of hydrofluoric acid_____grams__   134
Distilled water_____mm__ 7,056
Dioctyl sodium sulfosuccinate_____do____   918
Methanol _____do____ 2,250

The spray gun was maintained in a stationary position about 14 inches above the glass sheet and each glass sheet was moved through the spray path at an angle of about 90° to the spray path at a constant conveyor speed of about 9 inches per second. By conducting the spraying in this manner the time that each plate was in contact with the spray was about the same.

The air pressure on the spray gun was 62 pounds per square inch. The amount of spraying solution striking each plate was controlled by varying the pressure on the spraying solution flow line.

The spray pattern was in the form of a dumbbell or "split" spray pattern, i.e., an elongated spray pattern which is more concentrated at the end regions thereof than in the center region thereof such as shown in FIGURE 4. The sheet was passed through the spray so that the edges of the sheet which measure 26 inches in length, passed through the spaced, dense regions 15 and 16 of the elongated spray.

The resistance distribution of the transparent electroconductive tin oxide films thus obtained are tabulated in Table I below together with the corresponding spraying conditions:

*Table I*

| Plate No. | Amt. of solution sprayed, grams/sec. | Solution Pressure, lbs./sq. in. | Surface Resistivity Distribution Ohms per square | | |
|---|---|---|---|---|---|
| | | | Top | Center | Bottom |
| 1 | | | | | |
| 2 | 9.65 | 3 | 110 | 230 | 120 |
| 3 | 11.5 | 7 | 95 | 130 | 95 |
| 4 | 12.0 | 8 | 110 | 120 | 95 |
| 5 | 20.5 | 9 | 110 | 120 | 95 |
| 6 | 26.7 | 15 | 75 | 75 | 65 |
| | | 20 | 70 | 60 | 75 |

The resistance measurements under "top" and "bottom" were taken about one or two inches in from edges of the glass sheet which measure 26 inches in length. They were measured at areas similar to those designated by letters D and F in FIGURE 1 near the central portions of the edges of the sheet.

It can be seen from the results of the experiment above that in order to establish and maintain a resistance distribution wherein the resistance of the transparent electroconductive tin oxide film is greater at the edges of the film than in the center thereof, the spraying operation must be discontinued when a certain amount of solution is applied to the glass. When larger amounts of solution are applied, the ratio of the resistance between the center and edges of the glass sheet decreases gradually to the point where a film of substantially uniform surface resistivity is obtained.

EXAMPLE II

A further set of experiments was performed to verify the results shown in Example I. In this set of experiments, the rate of speed of the conveyor was varied, thereby varying the length of time in which each incremental area of the plate transverse to the axis of movement was in the spraying zone. All other conditions were maintained constant.

A series of five glass sheets 20" x 26" x ⁹⁄₆₄" were individually heated in a furnace at a furnace temperature of 1200° F. for about three minutes, conveyed from the furnace on a preheated horizontal conveyor and sprayed in the same manner as described in Example I with a stannic chloride solution having the ingredients of the solution described in Example I. In these experiments, the rate of flow of solution was maintained constant, but the speed of the conveyor was varied.

The surface resistivity distributions of the transparent electroconductive tin oxide films thus obtained are tabulated in Table II together with the corresponding spraying conditions:

Table II

| Plate No. | Conveyor speed, Inches/second | Surface Resistivity Distribution, Ohms per square | | |
|---|---|---|---|---|
| | | Top | Center | Bottom |
| 7 | 9 | 110 | 160 | 110 |
| 8 | 7.0 | 75 | 120 | 95 |
| 9 | 5.5 | 70 | 90 | 80 |
| 10 | 4.5 | 65 | 85 | 70 |
| 11 | 3.6 | 70 | 65 | 75 |

It can be seen from these results that by decreasing the conveyor speed, thereby increasing the spraying time or the time wherein the glass sheet is in the spraying area, the ratio of the surface resistivity of the film at the center of the glass to that at the edges of the glass gradually decreases to the point where a film of substantially uniform surface resistivity is obtained.

EXAMPLE III

An approximate measure was taken of the amount of solution striking the various areas of a 20″ x 26″ x 9/64″ glass sheet, traveling through a spray having a dumbbell or "split" spray pattern at a rate of nine inches per second, when the rate of flow of spraying solution employed was 8.67 grams per second. Three rectangular pans measuring 6⅔″ across were weighed and placed side by side so that their total width was approximately 20″. They were then passed through the spray with the edges of the pans which measure 20″ in combined length passing through the spray in a position parallel to the elongated spray. The amount of liquid striking each pan was collected and the pans containing the liquid were weighed. The outer pans collected 3.84 and 2.80 grams of solution respectively and the central pan collected 0.40 gram of solution. This gives an indication of the variation in the amount of solution striking the surface of a glass base when a "split" or dumbbell spray pattern is employed.

EXAMPLE IV

A series of three glass sheets 20″ x 26″ x 9/64″ were heated individually in a furnace at a furnace temperature of about 1200° F. for about three minutes, conveyed from the furnace on a preheated horizontal conveyor and immediately sprayed with a stannic chloride solution having the composition disclosed in Example I.

The spraying equipment used was the same equipment as that employed in Example I. The air pressure on the spray gun was 32 pounds per square inch and the solution pressure was about four pounds per square inch, delivering about 0.42 gram of solution per second.

The spray pattern employed was that of a round spray wherein the central region of the pattern is more concentrated than the edge portions of the spray. The glass sheet was passed through the spray so that the edges of the sheet which measure 26 inches in length passed through the less dense or edge regions of the spray. The speed of the conveyor was varied as shown below in order that different spraying times could be employed. The circular pattern tended to produce a film which has a resistance distribution wherein the center portion of the glass sheet has a lower resistance than the edges of the glass sheet. The results of such experiments are shown below in Table III:

Table III

| Plate No. | Conveyor Speed, Inches/second | Surface Resistivity Distribution, Ohms per square | | |
|---|---|---|---|---|
| | | Top | Center | Bottom |
| 12 | 30 | 700 | 260 | 600 |
| 13 | 20 | 280 | 130 | 190 |
| 14 | 9 | 65 | 77 | 70 |

Spray patterns other than those described above may be used to produce transparent electroconductive films of non-uniform resistance per unit area. For example, the spray gun may be adjusted to form an elongated spray pattern where one end region or the center region of the elongated pattern is more concentrated than the other regions of the spray. The type of spray pattern which is employed will depend upon the shape of the base upon which a film is to be deposited as well as the surface resistivity distribution desired.

It can be seen from these examples that the permissible time for conducting the spraying operation while maintaining a designated spray pattern, such as a dumbbell spray pattern, varies with the density of the spray, i.e., the total amount of solution striking the surface to be sprayed. Times of from 2 to 10 seconds have been found to be suitable in the practice of the invention. At any rate, it is generally found that spray times of above 20 seconds are to be avoided.

The invention is particularly applicable to use in connection with the deposition of a transparent tin oxide film. However, the invention is also applicable in connection with tin oxide and other metal oxides in combination in the same film, such as films containing a major amount, at least 70 to 80 percent by weight, of tin oxide with minor amounts of the oxides of antimony, copper, zinc, thallium, vanadium, chromium, manganese, cobalt, cadmium, indium or titanium or mixtures thereof. Furthermore, the invention is applicable with other transparent electroconductive metal oxide films, such as cadmium oxide, zinc oxide, indium oxide, etc., which may be prepared by using the bromide, chloride or acetate of the corresponding metal. Transparent metal oxide films normally have poor light transmission but are suitable where their property is not seriously objectionable.

What is claimed is:

1. In the method of providing a surface of a longitudinally extending refractory base with a metal oxide film formed as a heat reaction product of a hydrolizable metal salt, the improvement in forming a metal oxide film having a longitudinally extending thick area along a longitudinal edge portion of the base and a longitudinally extending thin area spaced from said longitudinal edge portion, which method comprises heating said refractory base to a temperature of above 400° F. and below the temperature at which the base becomes molten, dispensing toward the heated base a relatively cool spray of non-uniform density of a composition containing a heat reactive hydrolizable metal salt capable of forming a metal oxide film upon contacting a refractory base whose temperature is above 400° F. but incapable of forming a metal oxide film upon contacting the refractory base when the base is at a temperature substantially below 400° F., directed along a central axis thereof, said spray being relatively dense at one region and relatively sparse at another region, aligning the dense region of the spray with the one longitudinal edge portion of the heated base and the sparse region of the spray with the area of the base spaced from the longitudinal edge portion, establishing relative lateral movement between the heated refractory base and the central axis of the spray that increments of the longitudinal edge portion of the base are exposed in succession to the dense portion of the spray and increments of the longitudinally extending area spaced from said longitudinal edge portion of the base are exposed in succession to the sparse region of the spray to heat react said hydrolizable metal salt and thus form a thick metal oxide film on said base in each of said increments thereof exposed to the dense region of said spray and a thin metal oxide film on said base in each of said increments thereof exposed to the sparse region of said spray, and to cool the increments of said base exposed to the dense region of said spray at a different rate than the increments of said base exposed to the sparse region of said spray are cooled, and discontinuing the exposure to the spray of each increment of the surface of the heated refractory base and heat reaction of said hydrolizable metal salt after a period of time sufficient to form a continuous film of a metal oxide composition formed as the heat reaction product of said hydrolizable metal salt thereon having a relatively thick area at the longitudinal edge portion and a relatively thin area spaced therefrom, but before the temperature of any portion of the increment is cooled to below the minimum heat reaction film forming temperature.

2. In the method of providing the surface of a curved longitudinally extending refractory base with a metal oxide film formed as a heat reaction product of a hydrolizable metal salt, the improvement in forming a metal oxide film having a longitudinally extending thick area on a longitudinal edge portion and gradually tapering in thickness from said longitudinal edge portion, which method comprises heating said refractory base to a temperature of above 400° F. and below the temperature at which the base becomes molten, dispensing toward the heated base a relatively cool spray of non-uniform density of a composition containing a heat reactive hydrolizable metal salt capable of forming a metal oxide film upon contacting a refractory base whose temperature is above 400° F. but incapable of forming a metal oxide film upon contacting the refractory base when the base is at a temperature substantially below 400° F., directed along a central axis thereof, said spray being relatively dense at one region thereof and decreasing in density from said dense region, aligning the dense region of the spray with the longitudinal edge portion of the heated base and the sparse region of the spray with a longitudinally extending area of the base spaced from the longitudinal edge portion, establishing relative lateral movement between the heated refractory base and the central axis of the spray so that increments of the longitudinal edge portion of the base are exposed in succession to the dense portion of the spray and increments of the longitudinally extending area spaced from said longitudinal edge portion are exposed in succession to the sparse region of the spray to heat react said hydrolizable metal salt and thus form a thick metal oxide film on said base in each of the increments thereof exposed to the dense region of said spray and a thin metal oxide film on said base in each of the increments thereof exposed to the sparse region of said spray and to cool the increments of said base exposed to the dense region of said spray at a different rate than the increments of said base exposed to the sparse region of said spray are cooled, and discontinuing the exposure to the spray of each increment of the surface of the heated refractory base and the heat reaction of said hydrolizable metal salt after a period of time sufficient to form a continuous film of a metal oxide composition formed as the heat reaction product of said hydrolizable metal salt thereon having a relatively thick portion at the longitudinal edge portion and tapering in thickness from said longitudinal edge portion, but before the temperature of any portion of the increment is cooled to below the minimum heat reaction film forming temperature.

3. In the method of providing a surface of a longitudinally extending refractory base having non-parallel leading and trailing edges with a metal oxide film formed as a heat reaction product of a hydrolizable metal salt, the improvement in forming a metal oxide film having a longitudinally extending thick area along the long longitudinal edge portion and a longitudinally extending thin area along the short longitudinal edge portion, which method comprises heating said refractory base to a temperature of above 400° F. and below the temperature at which the base becomes molten, dispensing toward the heated base a relatively cool spray of non-uniform density of a composition containing a heat reaction hydrolizable metal salt capable of forming a metal oxide film upon contacting a refractory base whose temperature is above 400° F. but incapable of forming a metal oxide film upon contacting the refractory base when the base is at a temperature substantially below 400° F., directed along a central axis thereof, said spray being relatively dense at one extremity thereof and relatively sparse at its other extremity, aligning the dense region of the spray with the long longitudinal edge portion of the heated base and the sparse region of the spray with the short longitudinal edge portion of the base, establishing relative lateral movement between the heated refractory base and the central axis of the spray so that increments of the long longitudinal edge portion of the base are exposed in succession to the dense region of the spray and increments of the short longitudinal edge portion of the spray are exposed in succession to the sparse region of the spray to heat react said hydrolizable metal salt and thus form a thick metal oxide film on said base in each of the increments thereof exposed to the dense region of said spray and a thin metal oxide film on said base in each of the increments thereof exposed to the sparse region of said spray and to cool the increments of said base exposed to the dense region of said spray at a different rate than the increments of said base exposed to the sparse region of said spray are cooled, and discontinuing the exposure to the spray of each increment of the surface of the heated refractory base and the heat reaction of said hydrolizable metal salt after a period of time sufficient to form a continuous film of a metal oxide composition formed as the heat reaction product of said hydrolizable metal salt thereon having a relatively thick area at the long longitudinal edge portion and a relatively thin area at the short longitudinal edge portion, but before the temperature of any portion of the increment is cooled to below the minimum heat reaction, film forming temperature.

4. The method of providing a surface of a longitudinally extending refractory base having non-parallel leading and trailing edges with a transparent, electroconductive, metal oxide film formed as a heat reaction product of a hydrolizable metal salt, said film having a longitudinally extending thick area along the long longitudinal edge portion and a longitudinally extending thin area along the short longitudinal edge portion, which method comprises heating said refractory base to a temperature of above 400° F. and below the temperature at which the base becomes molten, dispensing toward the heated base a relatively cool spray of non-uniform density of a composition containing a heat reactive hydrolizable metal salt capable of forming a transparent, electroconductive metal oxide film upon contacting a refractory base whose temperature is above 400° F. but incapable of forming a metal oxide film upon contacting the refractory base when the base is at a temperature substantially below 400° F., directed along a central axis thereof, said spray being relatively dense at one extremity thereof and relatively sparse at its other extremity, aligning the dense region of the spray with the long longitudinal edge portion of the heated base and the sparse region of the spray with the short longitudinal edge portion of the base, establishing relative lateral movement between the heated refractory base and the central axis of the spray so that increments of the long longitudinal edge portion of the base are exposed in succession to the dense region of the spray and increments of the short longitudinal edge portion of the base are exposed in succession to the sparse region of the spray to heat react said hydrolizable metal salt and thus form a thick metal oxide film on said base in each of the increments thereof exposed to the dense region of said spray and a thin metal oxide film on said base in each of the increments thereof exposed to the sparse region of said spray and to cool the increments of said base exposed to the dense region of said spray at a different rate than the increments of said base exposed to the sparse region of said spray are cooled, and discontinuing the exposure to the spray of each increment of the surface of the heated refractory base and heat reaction of said hydrolizable metal salt after a period of time sufficient to form a continuous film of a metal oxide composition formed as the heat reaction product of said hydrolizable metal salt thereon having a relatively thick area at the longer longitudinal edge portion and a relatively thin area at the shorter longitudinal edge portion, but before the temperature of any portion of the increment is cooled to below the minimum heat reaction, film forming temperature.

5. In the method of producing a transparent electroconductive article having a pair of non-parallel bus bars and a transparent, electroconductive film of non-uniform thickness in electrical contact with the bus bars, said transparent electroconductive film formed as a heat reaction product of a hydrolizable metal salt and being thicker in the region where the bus bars are relatively widely spaced and thin in the region where the bus bars are most closely spaced, the improvement comprising heating said refractory base to a temperature of above 400° F. and below the temperature at which the base becomes molten, dispensing toward the heated base a relatively cool spray of a composition containing a heat reactive hydrolizable metal salt capable of forming a transparent, electroconductive metal oxide film upon contacting a refractory base whose temperature is above 400° F. but incapable of forming a metal oxide film upon contacting the refractory base when the base is at a temperature subsantially below 400° F., directed along a central axis thereof, said spray being relatively dense at one extremity thereof and tapering in density to the other extremity, orienting the heated base so that one of the non-parallel edges is a leading edge and the surface containing the bus bars is exposed to the spray, aligning the dense region of the spray with the long longitudinal edge portion of the heated base extending between the non-parallel bus bars and the sparse region of the spray with the short longitudinal edge portion of the base extending between the non-parallel bus bars, establishing relative lateral movement between the heated refractory base and the central axis of the spray so that increments of the long longitudinal edge portion of the base are exposed in succession to the dense portion of the spray and increments of the short longitudinal edge portion of the base are exposed in succession to the sparse region of the spray to heat react said hydrolizable metal salt and thus form a thick metal oxide film on said base in each of the increments thereof exposed to the dense region of said spray and a thin metal oxide film on said base in each of the increments thereof exposed to the sparse region of said spray and to cool the increments of said base exposed to the dense region of said spray at a different rate than the increments of said base exposed to the sparse region of said spray are cooled, and discontinuing the exposure to the spray of each increment of the surface of the heated refractory base and the heat reaction of said hydrolizable metal salt after a period of time sufficient to form a continuous film of a metal oxide composition formed as the heat reaction product of said hydrolizable metal salt having a relatively thick area at the long longitudinal edge portion and a relatively thin area at the short longitudinal edge portion, but before the temperature of any portion of the increment is cooled to below the minimum heat reaction, film forming temperature.

6. In the method of providing the surface of a longitudinally extending refractory base with a metal oxide film formed as a heat reaction product of a hydrolizable metal salt, the improvement in forming a metal oxide film having thick areas on said surface adjacent its longitudinal edge portions and a thin area on said surface in the intermediate portion between said longitudinal edge portions, which method comprises heating said refractory base to a temperature above about 400° F. but below the temperature at which the base becomes molten, dispensing toward the heated base a relatively cool spray of a composition containing a heat reactive hydrolizable metal salt capable of forming a metal oxide film upon contacting a refractory base whose temperature is above 400° F. but incapable of forming a metal oxide film upon contacting the refractory base when the base is at a temperature substantially below 400° F., directed along a central axis thereof, said spray being wider and denser adjacent its extremities than in its intermediate region, aligning the spaced dense extremities of the spray with the spaced longitudinal edge portions of a surface of a heated base and the less dense intermediate region of the spray with the intermediate portion of the base, establishing relative lateral movement between the heated refractory base and the central axis of the spray so that increments of the longitudinal edge portions of the base are exposed in succession to the extremities of the spray and increments of the intermediate portion of the base are exposed in succession to the intermediate region of the spray to heat react said hydrolizable metal salt and thus form a thick metal oxide film on said base in each of the increments thereof exposed to the dense region of the spray, and a thin metal oxide film on said base in each of the increments thereof exposed to the sparse region of said spray and to cool the increments of said base exposed to the dense region of said spray at a different rate than the increments of said base exposed to the sparse region of said spray are cooled, and discontinuing the exposure to the spray of each increment of the surface of the heated refractory base and the heat reaction of said hydrolizable metal salt after a period of time sufficient to form a continuous film of a metal oxide composition formed as the heat reaction product of said hydrolizable metal salt having thick areas adjacent the spaced longitudinal edge portions of the base and a thin area in the intermediate portion of the base, but before the temperature of any portion of the increment falls below the minimum heat reaction, film forming temperature.

7. The method of providing the surface of a longitudinally extending refractory base having longitudinally extending bus bars in the longitudinal edge portions therewith a transparent electroconductive metal oxide film of formed as a heat reaction product of a hydrolizable metal salt, said film having thick areas in the vicinity of said bus bars and a thin area on said surface intermediate said bus bars, which method comprises heating the refractory base to a temperature above about 400° F. but below the temperature at which the base becomes molten, dispensing toward the heated base a relatively cool spray of a composition containing a heat reactive hydrolizable metal salt capable of forming a transparent, electroconductive metal oxide film upon contacting a refractory base whose temperature is above 400° F. but incapable of forming a metal oxide film upon contacting the refractory base when the base is at a temperature substantially below 400° F., directed along a central axis thereof, said spray being wider and denser adjacent its extremities than in its intermediate region, aligning the spaced dense extremities of the spray with the spaced longitudinal extending bus bars and the intermediate region of the spray with the intermediate portion of the base, establishing relative lateral movement between the heated refractory base and the central axis of the spray so that increments of the longitudinal edge portions of the base are exposed in succession to the extremities of the spray and increments of the intermediate longitudinal portion of the base are exposed in succession to the intermediate region of the spray to heat react said hydrolizable metal salt and thus form a thick metal oxide film on said base in each of the increments thereof exposed to the dense region of the spray and a thin metal oxide film on said base in each of the increments thereof exposed to the sparse region of said spray and to cool the increments of said base exposed to the dense region of said spray at a different rate than the increments of said base exposed to the sparse region of said spray are cooled, and discontinuing the exposure to the spray of each increment of the surface of the heated refractory base and the heat reaction of said hydrolizable metal salt after a period of time sufficient to form a continuous film of a metal oxide composition formed as the heat reaction product of said hydrolizable metal salt having thick areas adjacent the spaced longitudinal edge portions of the base and a thin area in the intermediate longitudinal portion of the base, but before any portion of the increment is cooled to below the minimum heat reaction, film forming temperature.

8. In the method of providing a surface of a longitudinally extending refractory base with a metal oxide film formed as a heat reaction product of a hydrolizable metal salt, the improvement in forming a metal oxide film having a predetermined transverse thickness configuration and of substantially uniform thickness along any longitudinal axis thereof, which method comprises heating said refractory base to a temperature above 400° F. and below the temperature at which the base becomes molten, dispensing toward the heated base a relatively cool spray of a composition containing a heat reactive hydrolizable metal salt capable of forming a metal oxide film upon contacting a refractory base whose temperature is above 400° F. but incapable of forming a metal oxide film upon contacting the refractory base when the base is at a temperature substantially below 400° F., directed along a central axis thereof, said spray varying in density from one extremity to its other extremity according to the predetermined configuration, aligning the spray along an axis transverse to the longitudinal axis of the base, passing the heated refractory base longitudinally through the spray so that increments of the base along its longitudinal axis are exposed in succession to the transverse configuration of the spray to heat react said hydrolizable metal salt and thus form a metal oxide film of a predetermined thickness on said base in an increment thereof exposed to a region of said spray of a predetermined density and a metal oxide film of a different predetermined thickness on said base in an increment thereof exposed to a region of said spray of a different predetermined density and to cool an increment of said base exposed to a region of said spray of a predetermined density at a rate different than an increment of said base exposed to a region of said spray of a different predetermined density is cooled, removing each increment from the spray and discontinuing the heat reaction of said hydrolizable metal salt after a time sufficient to form a continuous film of a metal oxide composition formed as the heat reaction product of said hydrolizable metal salt thereon having the desired transverse configuration but before the temperature of any portion of the increment is cooled to below the minimum heat reaction, film forming temperature.

9. The method of providing the surface of a longitudinally extending refractory base adapted solely for use with bus bars along the longitudinal edges thereof with a transparent electroconductive film formed as a heat reaction product of a hydrolizable metal salt, said film having thick areas of maximum conductivity on said surface adjacent said bus bars and thinner areas of lower conductivity on said surface in the central area between said bus bars to prevent establishing high current densities in areas adjacent said bus bars, which method comprises heating said refractory base to a temperature above about 400° F. but below the temperature at which the base becomes molten, establishing a relatively cool spray of a liquid containing a hydrolizable metal salt, electroconductive metal oxide film-forming compound capable of forming a metal oxide film upon contacting a refractory base whose temperature is above 400° F. but incapable of forming a metal oxide film upon contacting said refractory base when the base is at a temperature substantially below 400° F., directed along a central axis thereof, said spray being wider and denser adjacent the upper and lower ends of the spray than in the central region thereof between said spaced denser portions of said spray, exposing the surface of said heated base adjacent the spaced longitudinal edges thereof adapted to engage said bus bars to the respective spaced dense portions of said spray and the central area of said base to said less dense portion of said spray located between said spaced dense portions thereof, establishing relative lateral movement between said heated refractory base and the central axis of said spray to heat react said hydrolizable metal salt and to cool different portions of the base exposed to different portions of the spray of different density at different cooling rates, maintaining the surface of said base exposed so said spray transversely to and at a predetermined angle with respect to the central axis of said spray, exposing the surface of said heated refractory base to said spray for a period of time sufficient to form a continuous film of a metal oxide composition formed as the heat reaction product of said hydrolizable metal salt thereon having thick areas adjacent the spaced longitudinal areas of said base and thinner areas in the central area of said base, but insufficient for forming a film of uniform thickness on all portions of the base and discontinuing the spray and the heat reaction of said hydrolizable metal salt before any portion of said base is cooled below the minimum heat reaction, film forming temperature and before a film of uniform thickness on all portions of said base is formed.

10. The method of claim 9 wherein said electroconductive film-forming compound is a tin compound and said electroconductive film comprises tin oxide.

11. The method of claim 9 wherein said heated refractory base is moved continuously through said spray and said electroconductive film is continuously formed on the surface of said base.

12. The method of claim 9 wherein the surface of said heated refractory body exposed to said spray is positioned substantially perpendicular to the central axis of said spray.

13. The method of claim 9 wherein the spray is discontinued at the expiration of a period of less than 20 seconds.

14. The method of claim 9 wherein the spray is discontinued at the expiration of a period of from 2 to 10 seconds.

15. In the method of providing a surface of a longitudinally extending refractory base with a metal oxide film formed as a heat reaction product of a hydrolizable metal salt, the improvement in forming a metal oxide film having a longitudinally extending thick area along a longitudinal edge portion of the base and a longitudinally extending thin area spaced from said longitudinal edge portion, which method comprises heating said refractory base to a temperature of above 400° F. and below the temperature at which the base becomes molten, dispensing toward the heated base a spray of non-uniform density of a composition containing a heat reactive hydrolizable metal salt capable of forming a metal oxide film upon contacting a refractory base whose temperature is above about 400° F. and directed along a central axis thereof, said spray being relatively dense at one region and relatively sparse at another region, aligning the dense region of the spray with the one longitudinal edge portion of the heated base and the sparse region of the spray with the area of the base spaced from the said one longitudinal edge portion, establishing relative lateral movement between the heated refractory base and the central axis of the spray so that the one longitudinal edge portion of the base is exposed progressively in succession to the dense portion of the spray and the longitudinally extending area spaced from the one longitudinal edge portion of the base is exposed progressively in succession to the sparse region of the spray to heat react said hydrolizable metal salt and thus form a thick metal oxide film on said base in the portions thereof exposed to the dense region of said spray and a thin metal oxide film on said base in the portions thereof exposed to the sparse region of said spray and to cool the portions of said base exposed to the dense region of said spray at a different rate than the portions of said base exposed to the sparse region of said spray are cooled and discontinuing the spray on the surface of the longitudinal portions of the base exposed thereto and the heat reaction of said hydrolizable metal salt before a film of a metal oxide composition formed as the heat reaction product of said hydrolizable metal salt of uniform thickness throughout said surface forms and before the temperature of any portion of the base is cooled to below the minimum heat reaction, film forming temperature.

16. The method of claim 15 wherein the spray is discontinued at the expiration of a period of less than 20 seconds.

17. The method of claim 15 wherein the spray is discontinued at the expiration of a period of from 2 to 10 seconds.

References Cited in the file of this patent

UNITED STATES PATENTS

| | | |
|---|---|---|
| 1,964,322 | Hyde | June 26, 1934 |
| 2,061,107 | Schellenger | Nov. 17, 1936 |
| 2,429,420 | McMaster | Oct. 21, 1947 |
| 2,564,706 | Mochel | Aug. 21, 1951 |
| 2,569,773 | Orr | Oct. 2, 1951 |
| 2,689,803 | Ackerman | Sept. 21, 1954 |

FOREIGN PATENTS

| | | |
|---|---|---|
| 153,241 | Australia | Sept. 16, 1953 |

UNITED STATES PATENT OFFICE
CERTIFICATE OF CORRECTION

Patent No. 3,019,135                        January 30, 1962

Leighton E. Orr

It is hereby certified that error appears in the above numbered patent requiring correction and that the said Letters Patent should read as corrected below.

Column 3, line 43, for "applied in such" read -- applied is such --; column 12, line 61, for "spray that" read -- spray so that --; column 13, line 74, for "reaction" read -- reactive --; column 18, line 15, for "so said" read -- to said --.

Signed and sealed this 6th day of November 1962.

(SEAL)
Attest:

ERNEST W. SWIDER
Attesting Officer

DAVID L. LADD
Commissioner of Patents